United States Patent [19]

Murdoch

[11] 4,434,811

[45] Mar. 6, 1984

[54] COUPLING SEAL AND METHOD OF ASSEMBLY

[75] Inventor: Ian G. Murdoch, Longview, Tex.

[73] Assignee: The Oilgear Company, Milwaukee, Wis.

[21] Appl. No.: 402,561

[22] Filed: Jul. 28, 1982

[51] Int. Cl.³ ............................................... F16J 9/12
[52] U.S. Cl. ........................................ 137/515; 277/9; 277/188 A; 277/203; 285/347; 285/351
[58] Field of Search ................. 137/515, 515.3, 515.5, 137/515.7; 277/9, 11, 188 A, 203; 285/347, 351, 353, 354, 357

[56] References Cited

U.S. PATENT DOCUMENTS

| | | | |
|---|---|---|---|
| 2,750,958 | 6/1956 | Baker et al. | 137/515.7 |
| 3,058,534 | 10/1962 | Keithahn | 137/515.7 |
| 3,831,954 | 8/1974 | Longfellow | 277/9 |
| 3,948,532 | 4/1976 | Hopp | 277/11 |
| 4,231,578 | 11/1980 | Traub | 277/188 A |

*Primary Examiner*—Alan Cohan
*Assistant Examiner*—John A. Rivell
*Attorney, Agent, or Firm*—Weber, Raithel, Malm, La Fave & Backus

[57] ABSTRACT

Coupling joint seals, for oil well head high pressure control equipment particularly for the assemblies of riser tubes thereof on wireline equipment, have the coupling containing a seal constructed and arranged to permit the use of a rigid non-extrusion ring, preferably of yellow brass, as a retainer or back up ring as an element of the seal. The arrangement includes a groove cut into a cylindrical surface of a coupling member that enters an annular slot therein that shall contain the seal means to be disposed therein. The rigid non-extrusion ring is screwed or threaded through the groove and into the annular slot.

6 Claims, 6 Drawing Figures

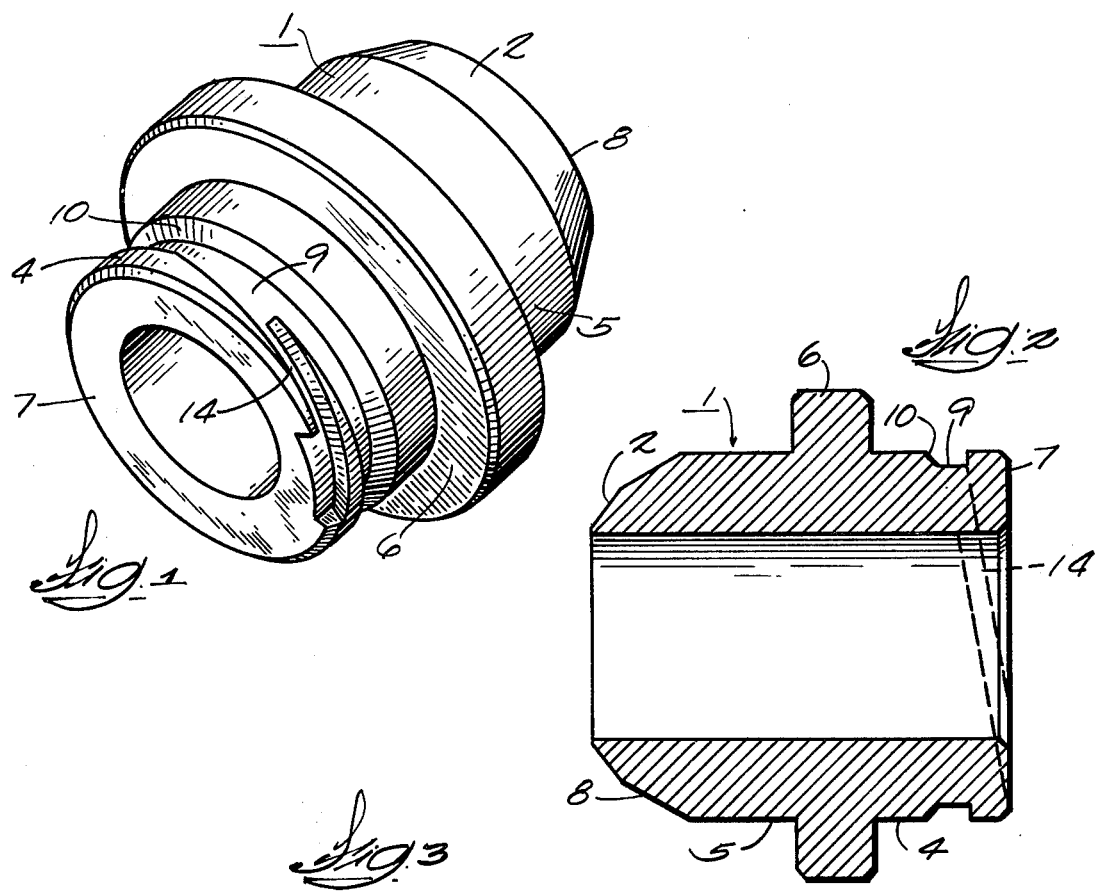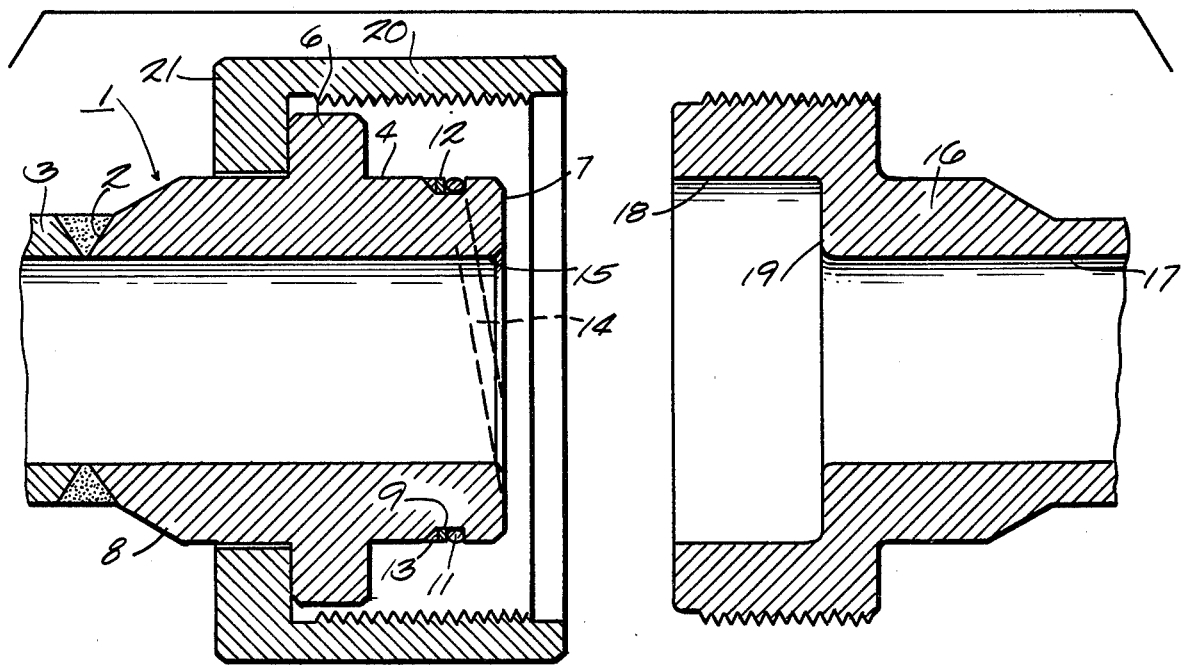

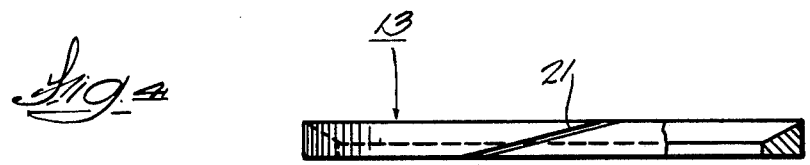
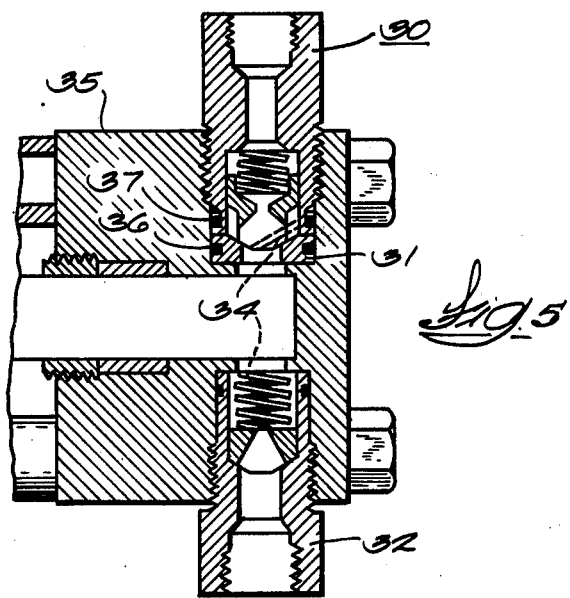
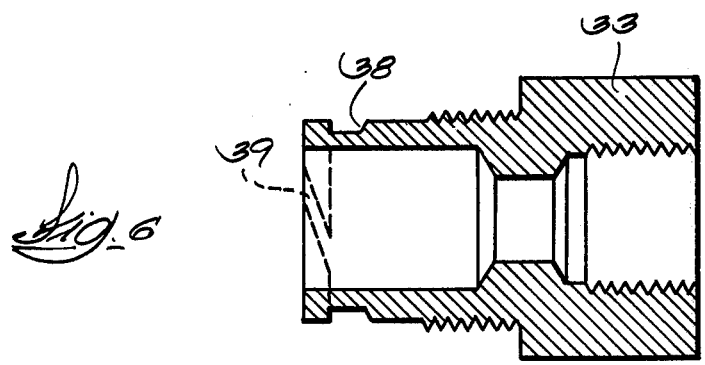

COUPLING SEAL AND METHOD OF ASSEMBLY

SUMMARY

Heretofore, a coupling for high pressure well head equipment comprised a seal means including a non-extrusion ring required that the ring be forced over the end thereof and into the annular slot for the seal means, thereby resulting in assembly difficulty and efficient pressure sealing.

The present invention relates to the construction and arrangement of a coupling for high pressure applications, such as for oil well head equipment, characterized in that a so-called pin coupling, the male member of a coupling, is provided with a spiral groove that leads from its end into an annular slot into which the seals means is to be disposed. The spiral lead in groove permits introducing the seal means into the annular slot without injury, damage or over stress of an element of the seal means.

The seal means comprises a rigid first non-extrusion back up ring preferably made of yellow brass metal, a second non-extrusion back up ring made of metal or teflon, and an O-ring of flexible material.

A rigid non-extrusion back up ring made of yellow brass is substantially nonresilient but offers excellent wear and non-galling characteristics for the seal means. The rigid back up ring is cut through preferably at a small angle to permit lateral separation of the ends sufficient to introduce one end into the spiral groove and screwing the back up ring through the spiral groove and into the annular slot.

Other applications for the invention are check valves for an intensifier and couplings for the inlet and outlet ports of a high pressure pump.

In each of these applications the spiral groove, for introducing a rigid non-extrusion back up ring into an annular slot for seal means, is formed at a small angle with the annular slot of not more than 10 degrees. The spiral lead in groove has a width to accomodate entry of any element of the seal means, and a depth not greater than the depth of the annular slot, so as not to interrupt the bottom surface of the seal slot. The pitch angle of the spiral groove accomodates the lateral flexibility of the ends of the rigid back up ring, when introducing it by way of the spiral groove into the annular slot, so that the back up ring is not overstressed, stretched, damaged or deformed in disposing it into the seal slot. The coupling when assembled provides an effective seal for pressures in the range of 20,000 psi, and subsequent disassembly, replacement of the seal means if necessary and reassembly of the coupling is relatively easy and quick.

OBJECTS

It is an object of the invention to provide an annular slot in a coupling member having an annular seal therein comprising a rigid seal member and structure of the coupling member permitting introduction of the rigid seal member without overstressing or deforming the rigid seal member.

Another object of the invention is to provide a rigid back up ring in an annular slot in a cylindrical surface of a male member of a coupling or check valve, that otherwise may be seriously deformed by forcing the back up ring over the nose of the lead end of the male member and into the annular slot, but can be inserted without being deformed by threading the back up ring through a spiral groove that leads into the annular slot.

THE DRAWINGS

FIG. 1 of the drawings is a perspective of a pin element of a coupling showing an annular slot and a spiral groove leading to the annular slot for the introduction into the slot of a rigid back up ring for a seal means to be contained in the annular slot.

FIG. 2 is a plan view partially in section of the pin coupling of FIG. 1.

FIG. 3 is a plan view of the pin coupling with the seal means in the annular slot and a female element of the coupling shown separate therefrom.

FIG. 4 is a plan view of a rigid back up ring, as an element of a seal means, to be inserted in the annular slot.

FIG. 5 is another application for the feature of the seal means structure which shows it applied to check valves; and FIG. 6 is another application for the feature of the seal means structure which shows it applied as an insert to an inlet or outlet port for a pump.

DESCRIPTION

Referring to the drawings, FIGS. 1, 2, and 3 show a pin coupling element; for a riser tube or joint of high pressure piping of well head apparatus, which is a preferred application for the pin coupling. The pin coupling is welded at end surface 2 to well head piping 3.

The pin coupling has cylindrical surfaces 4,5 at its leading end 7 and its trailing end 8 and an abuttment or thrust collar 6 therebetween and integral therewith.

The leading end 7 of the pin coupling is provided with an annular slot 9 at its cylindrical surface 4, with a trailing wall 10 of the annular slot inclined. The annular slot 9 contains sealing means disposed therein comprising a flexible O-ring 11, preferably a fairly rigid back up ring 12 of teflon or metal, such as brass or steel, and a very rigid back up ring 13 preferably of brass or steel. The latter rigid back up ring 13 is shaped to mate with the inclined wall 10 of the annular slot 9. The first back up ring 12 abuts the O-ring 11 and the second back up ring 13 abuts the first back up ring 12, so the sealing means which they form is snugly confined within the annular slot 9.

The sealing means comprising the rigid back up ring 13 and the pin coupling are constructed for ease of disposing the rigid back up ring 13 into the annular slot 9. The lead end 7 of the pin coupling 1 has a spiral groove 14 in its cylindrical surface 4 that leads from the lead end 7 into the annular slot 9. The spiral groove 14 makes an angle with the plane of the annular slot on the order of 10 degrees, so it extends only partially of the circumference of the pin coupling.

The spiral groove 14 has a width to accomodate the width of the rigid back up ring 13. The spiral groove 14 has a depth not more than the depth of the annular slot 9, so as not to interrupt the bottom surface of the annular slot 9.

The rigid back up ring 13, FIG. 4, has one transverse narrow cut 21 therethrough on the order of 0.015 inches wide. The cut may be angled with respect to the plane of the back up ring, and its angle is not more than 15 degrees. The direction of the angle corresponds to the lead into the spiral groove. To dispose the back up ring into the annular slot 9, the cut ends of the back up ring are laterally displaced slightly so one end may enter the spiral groove 14, the back up ring rotated therein until the entire back up ring 13 enters the annular slot 9. Then the other back up ring 12 and the O-ring are disposed in the annular slot.

A box 16 or female member of the coupling is also welded to a section of piping, not shown, and its central bore 17 alligns with the bore of piping and with a bore 15 of the pin coupling 1. A larger bore 18 in the box 16 is adapted to telescope over the cylindrical surface 4 of the leading end of the pin coupling to make close fitting engagement therewith. A shoulder 19 of the box 16 abuts the leading end 7 of the pin coupling 1. The outer surface of the leading end of the box is threaded for engagement with a corresponding threaded nut 20 on the pin coupling 1, which when threaded thereon pulls the box 16 up tight against the pin coupling. The nut 20 has an inward collar 21 that abuts the thrust collar 6 of the pin coupling 1.

When the coupling is assembled with the pin 1 and box 16 elements joined, the sealing means of the pin makes sealing engagement with the wall of the bore 18 of the box 16.

FIGS. 5 and 6 show other applications for the feature of assembling sealing means into an annular slot in a cylindrical surface of a lead end of an insert 30,31,32 which comprises a check valve, FIG. 5, and a pump insert 33 for an outlet or an inlet port of a pump.

In FIG. 5, the end or end head of a high pressure intensifier cylinder 35 has transverse bores receiving an outlet check valve 30,31, and an inlet check valve 32. The outlet check valve comprises a valve seat 31 disposed against a shoulder in the bottom of the bore, and a valve insert 30 disposed in threaded engagement in the cylinder bore and in abuttment with the valve seat 31. An outer cylindrical surface of the valve seat 31 has an annular slot 36 for receiving sealing means for engagement with the transverse bore. The lead end of the cylindrical surface of the insert 30 also has an annular slot 37 for receiving sealing means for engagement with the transverse bore. The sealing means of the check valve comprises a back up ring, such as described for FIG. 3, which is assembled by a similar method and means, such as by providing a lead-in spiral groove 34 that extends from the end thereof into the annular slot.

FIG. 6 is an insert 33 for an inlet or outlet port of a high pressure pump, that has a cylindrical surface lead end with an annular groove 38 therein for receiving sealing means comprising at least one rigid back up ring. This cylindrical surface has therein a spiral groove 39 that starts from the lead end of the insert and extends into the annular slot 38, such as described for FIGS. 1, 2, and 3.

I claim:

1. An assembly of operatively flow-through members detachably secured together comprising a body member having a bore and a pin member having a cylindrical shaped lead end fitted in said bore;
    said pin member having an annular slot in the cylindrical surface of said lead end, a spiral groove in the cylindrical surface of said lead end that extends from an end of said lead end to said annular slot, said spiral groove having a depth approximating but not greater than the depth of said annular slot; and said spiral groove makes an angle of not more than 10 degrees with said annular slot;
    sealing means between said body member and said pin disposed in said annular slot, said sealing means comprising a pair of back up rings and an O-ring, one of said backup rings is made of very rigid material, said one of said back up rings is cut through transversely thereof to provide an end for introducing said one of said back up rings into said spiral groove and threading it into said annular slot, said other of said back up rings abutting said one of said back up rings and said O-ring.

2. An assembly of operatively flow-through members as defined in claim 1 wherein said members form a coupling for a high pressure fluid line.

3. An assembly of operatively flow-through members as defined in claim 1 wherein said members form a check valve for high pressure applications, said pin member being an insert for said body members.

4. An assembly of operatively flow-through members as defined in claim 3 wherein said pin member includes a valve seat on the lead end thereof having an annular slot in its outer surface and a spiral groove leading thereto, sealing means in the annular slot of the valve seat reversely positioned from the sealing means disposed in the lead end of the pin.

5. A coupling for high pressure fluid applications, a female member having a bore, a cylindrical male member fitted in said bore, a lead end of said male member having a annular slot for receiving seal means therein for providing a seal between said members; said seal means comprising a first back up ring of rigid material abutting a second back up ring, and said second back up ring abutting a flexible O-ring, characterized in that said first back up ring cannot be inserted over said lead end and into such annular slot without deforming said first back up ring,
    said first back up ring is cut through transversely thereof, a spiral groove in the cylindrical surface of said lead end of said male member that extends from the end thereof to said annular slot, said spiral groove has a depth not more than the depth of said annular slot, said spiral groove makes an angle with said annular slot on the order of 10 degrees, whereby said first back up ring is slightly spread apart laterally thereof at the cut through portion and threaded through said spiral slot and into said annular slot, then said second back up ring and said O-ring are inserted into said annular slot and said male member inserted into said female member, and means to secure said male member to said female member.

6. In an assembly of operatively flow through members comprising a pin or male member and a box or female member which are detachably secured one to the other, said members are constructed and arranged to provide a seal against leakage of high pressure fluid between said members,
    said pin or male member having a cylindrical lead end for telescoping within a bore of said box or female member with a close fit therebetween, said pin or male member having an annular slot in the surface of said lead end with one wall of said slot being inclined;
    sealing means disposed in said annular slot comprising a retainer ring of rigid material and having an inclined side mating with said inclined wall of said slot, an annular back up ring of rigid material, and an O-ring of flexible material, said rigid retainer ring having a transverse cut therethrough which abuts said back up ring;
    said lead end of said pin or male member having in its cylindrical surface a spiral groove that spirals from said lead end to said annular slot, said spiral groove has a depth of not more than the depth of the annular slot and makes an angle with the annular slot of less than 10 degrees, whereby an end of said retainer ring at its transverse cut is introduced into the lead end of said spiral groove and slid or threaded therein to dispose the rigid retainer ring into the annular slot.

* * * * *